United States Patent
Sweary et al.

(10) Patent No.: US 11,720,426 B2
(45) Date of Patent: Aug. 8, 2023

(54) CLIENT-SIDE AUTOMATED APPLICATION PROGRAMMING INTERFACE (API) MAPPING

(71) Applicant: Walkme LTD, Tel-Aviv (IL)

(72) Inventors: Rephael Sweary, Ramat Gan (IL); Kobi Stok, Hod-HaSharon (IL); Nir Nahum, Tel-Aviv (IL)

(73) Assignee: WALKME LTD., Tel Aviv (IL)

( * ) Notice: Subject to any disclaimer, the term of this patent is extended or adjusted under 35 U.S.C. 154(b) by 13 days.

(21) Appl. No.: 17/451,801

(22) Filed: Oct. 21, 2021

(65) Prior Publication Data

US 2023/0131355 A1    Apr. 27, 2023

(51) Int. Cl.
| | |
|---|---|
| *G06F 9/54* | (2006.01) |
| *G06F 16/21* | (2019.01) |
| *G06F 16/28* | (2019.01) |
| *G06F 16/25* | (2019.01) |

(52) U.S. Cl.
CPC ............ *G06F 9/547* (2013.01); *G06F 16/213* (2019.01); *G06F 16/25* (2019.01); *G06F 16/287* (2019.01); *G06F 16/288* (2019.01)

(58) Field of Classification Search
CPC ........ G06F 9/547; G06F 16/213; G06F 16/25; G06F 16/287; G06F 16/288

USPC ......................................................... 709/217
See application file for complete search history.

(56) References Cited

U.S. PATENT DOCUMENTS

| | | | | |
|---|---|---|---|---|
| 2009/0216777 | A1* | 8/2009 | Wang | H04L 67/1042 |
| 2016/0092499 | A1* | 3/2016 | Leigh | G06F 8/34 |
| | | | | 707/740 |
| 2019/0325074 | A1* | 10/2019 | Ghezzi | G06F 9/547 |
| 2020/0192727 | A1* | 6/2020 | Savenkov | G06F 9/547 |
| 2022/0334834 | A1* | 10/2022 | Chartrand | G06F 8/35 |

* cited by examiner

*Primary Examiner* — Wing F Chan
*Assistant Examiner* — Leon Y Tseng

(57) ABSTRACT

A system, method and product for client-side automated application programming interface (API) mapping of a computerized system. The method comprises creating a mapping by: detecting, by a client-side agent that is operated on a client device executing a frontend of the computerized system, an invocation by a first application of the API function of a second application, wherein the API function is defined by a function prototype comprising a domain of potential values for an input or output parameter of the API function; and based on information gathered by the client-side agent, automatically determining a logical schema of the API function, wherein the logical schema defining a logical function prototype comprising a sub-domain of the domain of potential values, wherein the sub-domain restricting at least one value of the domain.

27 Claims, 6 Drawing Sheets

FIG. 4

CLIENT-SIDE AUTOMATED APPLICATION PROGRAMMING INTERFACE (API) MAPPING

TECHNICAL FIELD

The present disclosure relates to utilization of Application Programming Interface (API) within programs in general, and to automated mapping of APIs, in particular.

BACKGROUND

An Application Programming Interface (API) is a connection between computer programs. An API comprises an interface of a target program that is usable by other programs to utilize the target program's functionality. The API comprises a function interface or prototype (also referred to as "signature"), including the name of the function, the input parameters and the output parameters. For example, the API may include the function getUser, input parameters of "userId" of type "string" and "userType" of type "string", and output parameter of "user" of type "object". This can be denoted as follows: getUser(userId<String>, userType<String>)→User<Object>.

A computerized system may be implemented using an application stack, integrating several different applications using their respective APIs. Each application of the application stack may expose its own API and utilize the other applications' APIs, so as to work together to achieve a desired functionality.

Using different applications in a computerized system may cause bugs and errors in the system, specifically when one application changes its behavior or API, while the other application is not modified to adapt the new change. For example, if the function that is being called is no longer available in the API, the system may crash. Engineers often attempt to tackle such problems by developing an API that is backward compatible. However, in many cases, at least some API functions are deprecated over the years and manual effort may be required in order to replace invocations of such deprecated API functions.

BRIEF SUMMARY

One exemplary embodiment of the disclosed subject matter is a method comprising: creating a mapping of Application Programming Interface (API) functions utilization by a computerized system, wherein the computerized system comprises a plurality of applications that are configured to interact with one another using APIs, wherein said creating comprises: detecting, by a client-side agent that is operated on a client device executing a frontend of the computerized system, an invocation by a first application of the API function of a second application, wherein the API function is defined by a function prototype comprising a domain of potential values for an input or output parameter of the API function; and based on information gathered by the client-side agent, automatically determining a logical schema of the API function, wherein the logical schema defining a logical function prototype comprising a sub-domain of the domain of potential values, wherein the sub-domain restricting at least one value of the domain; and performing an action using the mapping.

Additionally, or alternatively, the domain is a string domain, wherein the sub-domain represent an enumeration of a set of predetermined strings.

Additionally, or alternatively, said automatically determining the logical schema comprises: identifying, at the frontend, a correlation between the input or output parameter of the API function and between a Graphical User Interface (GUI) selector element, wherein the GUI selector element defining the sub-domain.

Additionally, or alternatively, said automatically determining the logical schema comprises: identifying, at the frontend, a correlation between the input or output parameter of the API function and a GUI element having a data validation method configured to validate that data at the GUI element is in line with a validation rule, wherein the validation rule defining the sub-domain.

Additionally, or alternatively, said automatically determining the logical schema comprises: obtaining values of the input or output parameter across multiple executions of the computerized system; and determining the sub-domain based on an aggregation of the obtained values.

Additionally, or alternatively, said performing an action comprises: detecting a schema change, wherein the schema change is detected based on an identification of a provisioning of input parameter to the API function or receiving as an output parameter of the API function, a value that is in line with the domain defined by the function prototype and is restricted by the sub-domain defined by the logical function prototype; and reporting the schema change to a user.

Additionally, or alternatively, said reporting comprises reporting schema change of an affected API function, wherein the affected API function is identified based on the mapping.

Additionally, or alternatively, said performing the action comprises: identifying, in the mapping, two similar API functions, wherein said identifying the two similar API functions comprises: computing a similarity measurement for each pair of API functions in the mapping, wherein the similarity measurement is based on similarity of input and output parameters in a respective logical function prototype of each API function; and identifying a pair of API functions having a similarity measurement above a threshold.

Additionally, or alternatively, said performing the action comprises identifying duplicate records obtained from two different API functions, wherein said identifying the duplicate records comprises: identifying a first record received from the API function having the logical function prototype; identifying a second record received from a second API function having the logical function prototype; detecting that the first record and the second record are identical; and presenting in a Graphical User Interface (GUI) the first record and the second record as duplicate records.

Additionally, or alternatively, said performing the action comprises: simulating a schema change in the mapping to determine potential impact of the schema change on the computerized system; and outputting a report regarding the potential impact.

Additionally, or alternatively, said creating the mapping is further based on backend analysis of invocations of API functions at a backend of the computerized system, wherein the backend is executed remotely to the frontend and without user-visible interface.

Additionally, or alternatively, the client-side agent is at least one of: a standalone, client-side, program; a client-side code defined by the computerized system to be executed on the client device; a browser that is executed on the client device and utilized for operating the frontend of the computerized system; and a browser extension augmenting functionality of the browser.

Additionally, or alternatively, the computerized system comprises at least one of: a web application; a mobile application; and a desktop application.

Another exemplary embodiment of the disclosed subject matter is a system comprising: a processor; a memory coupled to the processor; and one or more client-side agents configured to be executed by respective client devices; wherein each client-side agent of said one or more client-side agents is configured be operated on a respective client device executing a frontend of the computerized system, wherein said each client-side agent is configured to detect an invocation by a first application of the API function of a second application, wherein the API function is defined by a function prototype comprising a domain of potential values for an input or output parameter of the API function; wherein said processor is configured to create a mapping of Application Programming Interface (API) functions utilization by a computerized system, wherein the computerized system comprises a plurality of applications that are configured to interact with one another using APIs, wherein the mapping is determined based on information gathered by said one or more client-side agents, wherein said processor is configured to automatically determine a logical schema of the API function, wherein the logical schema defining a logical function prototype comprising a sub-domain of the domain of potential values, wherein the sub-domain restricting at least one value of the domain.

Additionally or alternatively, said system is configured to: detect a schema change, wherein the schema change is detected based on an identification of a provisioning of input parameter to the API function or receiving as an output parameter of the API function, a value that is in line with the domain defined by the function prototype and is restricted by the sub-domain defined by the logical function prototype; and report the schema change to a user.

Additionally, or alternatively, said system is configured to identify two similar API functions in the mapping, wherein identification of the two similar API functions is based on a computation of a similarity measurement for each pair of API functions in the mapping, wherein the similarity measurement is based on similarity of input and output parameters in a respective logical function prototype of each API function.

Additionally, or alternatively, the system is configured to identify duplicate records obtained from two different API functions, wherein identification of the duplicate records comprises: identifying a first record received from the API function having the logical function prototype; identifying a second record received from a second API function having the logical function prototype; detecting that the first record and the second record are identical; and presenting in a Graphical User Interface (GUI) the first record and the second record as duplicate records.

Additionally, or alternatively, said processor is configured to simulate a schema change in the mapping to determine potential impact of the schema change on the computerized system, wherein said system is configured to output a report regarding the potential impact.

Additionally or alternatively, the system comprises a backend analysis module configured to analyze invocations of API functions at a backend of the computerized system, wherein the backend is executed remotely to the frontend and without user-visible interface, wherein the mapping is determined based on analysis by said backend analysis module.

Yet another exemplary embodiment of the disclosed subject matter is a non-transitory computer readable medium retaining program instructions, which program instructions when read by a processor, cause the processor to create a mapping of Application Programming Interface (API) functions utilization by a computerized system, wherein the computerized system comprises a plurality of applications that are configured to interact with one another using APIs, wherein said the mapping of API functions utilization is created by: detecting, by a client-side agent that is operated on a client device executing a frontend of the computerized system, an invocation by a first application of the API function of a second application, wherein the API function is defined by a function prototype comprising a domain of potential values for an input or output parameter of the API function; and based on information gathered by the client-side agent, automatically determining a logical schema of the API function, wherein the logical schema defining a logical function prototype comprising a sub-domain of the domain of potential values, wherein the sub-domain restricting at least one value of the domain; and wherein said program instructions when read by the processor, cause the processor to perform an action using the mapping.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 shows an illustration of an exemplary Graphical User Interface (GUI), in accordance with some exemplary embodiments of the disclosed subject matter;

DETAILED DESCRIPTION

Figure 1:
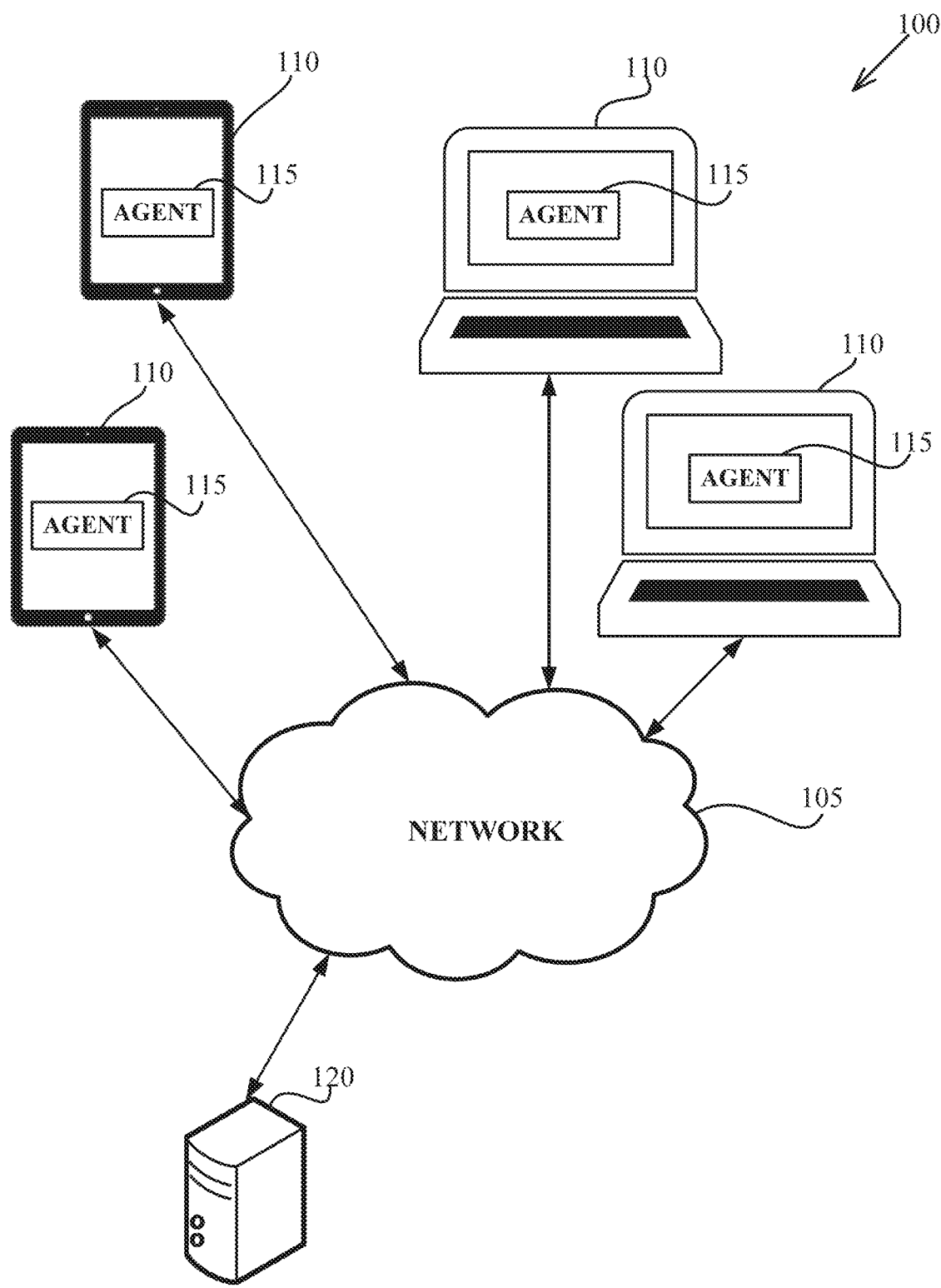
FIG. 1 shows a schematic illustration of an exemplary environment and architecture in which the disclosed subject matter may be utilized, in accordance with some exemplary embodiments of the disclosed subject matter.

One technical problem dealt with by the disclosed subject matter is to automatically map API functions that are being used throughout an automated business process implemented using several applications. In some exemplary embodiments, the use of several applications, which may not be tightly-coupled, may create application dependencies and potential bugs over time. In some exemplary embodiments, the API prototypes may remain unchanged, but a logical schema of the functions, which may not be formally declared, may be changed and potentially be the source of a bug. As opposed to changes in the API prototype, a logical schema change may not cause a runtime exception, signal triggering, compilation issues or other the like. The logical schema change may not immediately cause an obvious runtime error or appear in an error log. Instead, logical schema changes may remain unnoticed even after the first invocation of the modified program (or even many additional invocations). Automatic identification of a logical schema change may be desired.

In some exemplary embodiments, it may be desired to monitor application dependencies, in real-time, and notify on API changes so automated business processes can be modified quickly to continue with business as usual, without waiting for a bug to be exposed or noted.

Another technical problem may be to enable risk assessment before applying a change to the system. For example, when a Customer Relationship Management (CRM) application calls a Business Intelligence (BI) application, via an API, to retrieve and show a value in a CRM record, it may be desired to proactively monitor the return value and notify the customer if the returned value was returned and is in the correct format and range in accordance with a pre-existing logical schema.

One technical solution may be to create a system dependency graph and data flow throughout an application stack using a client-side agent. In some cases, the client-side agent can track data flow throughout the API, as well as track how such data is being used. In some exemplary embodiments, a logical schema of API functions may be automatically determined. In some exemplary embodiments, the logical schema may comprise an undeclared function prototype of the API function, which may differ from the formal, declared function prototype of the API function, such as defined by the API specification, API header files, API function declarations, or the like. In some exemplary embodiments, the function prototype may define a type of parameter of the API function, such as an input parameter provided to the API function when called, or an output parameter provided by the API function when processing is completed. The type of the parameter may define a domain of values that the parameter may receive, e.g., a set of alternative possible values for the parameter. For example, the type may be a string type, indicating that the parameter may receive any string. As another example, the type may be an integer capable of receiving any number value that can be written without fractional component within a certain range (e.g., using 8 bits: from −128 and until 127; using 16 bits: from −32,768 to 32,767 or between 0 and 65,535; or the like). The logical function prototype may include a more specific sub-domain of the domain of the formal, declared type, which excludes some values of the domain. For example, the sub-domain may include only specific strings, such as "MALE", "FEMALE", instead of any possible string; a set of specific values, such as 1 . . . 31, representing a day in the month instead of any integer; strings matching the regular expression "^+\ d{12}$" (e.g., beginning with the plus sign, followed by exactly twelve consecutive digits), representing a phone number format, instead of any string value; or the like.

As an example, using the client-side agent, it may be identified that the potential values of a Graphical User Interface (GUI) selector element are selected based on content from an API call. Using such information, it may be understood that the semantic data type in accordance with the logical schema is an enumeration (enum), even if the technical data type declared in the prototype is a string. Using such information, the client-side agent may detect cases where new values are returned, indicating that the enumeration was changed. For example, if new values are added to this selector element, schema change may be identified and an alert may be issued.

In another embodiment, client-side agents observe information over time and determine using statistics the type according to the logical schema. For example, phone number would be found to adhere to a specific format, but vary in value; free text would show various data points and variations and can be addressed as such; string-based enumeration would include a limited number of different values that are repeatedly used.

In some exemplary embodiments, the mapping may be based on front-end analysis. The client-side agent may operate on the client device. For example, the client-side agent may be a daemon agent executed on the client computer, monitoring interactions thereby. Additionally, or alternatively, the client-side agent may be a browser utilized for operating web-based applications, such as in case the target system is, at least partially, a web-based application. Additionally, or alternatively, the client-side agent may be a browser extension operative to implement monitoring capabilities when accessing web pages and other web-based applications. Additionally, or alternatively, the client-side agent may be implemented as client-side code embedded within a web-based application or other web pages. In some exemplary embodiments, the client-side agent may monitor information in the client side to determine the mapping.

In some exemplary embodiments, the client-side agent may track API calls and analyze API prototype (e.g., call signature, and argument types). Consider an API that includes the "getUser" function, with two input arguments (1) userId, a String and (2) returnType a String. While returnType is declared as a string, the information accumulated by the client-side agent may be utilized to determine that it is actually of a logical type of an enumeration. In some exemplary embodiments, the string values of the returnType argument may be tracked over time. For example, consider there are only two values that are encountered: "JSON" or "STRING". The logical schema of the returnType may be deduced to be enumeration of either "JSON" or "STRING". If during the operation of the system, a new value, e.g., "XML", is encountered, it may be deduced that enumeration type has changed. It is noted that as the returnType is technically defined as a String, providing the value "XML" will not cause a runtime error on its own. Nonetheless, the disclosed subject matter may identity such an event and indicate that a schema change has occurred for the "getUser" API call.

In some exemplary embodiments, whenever a schema change is detected, a new revision for the API call schema, with the date and time of the change, may be recorded. Such snapshot of schema changes may be useful for auditing purposes.

In some exemplary embodiments, the disclosed subject matter may be utilized for identifying API similarities.

As an example, consider two different API prototypes in two different providers (e.g., x.com and y.com): x.com/getUser(userId<String>, userType<String>)→User<Object>; y.com/getUser' (userId<String>, userType<String>)→User<Object>. As can be appreciated these are two endpoints with two different calls. However, in some cases, they may be equivalent or otherwise provide the same functionality. In some exemplary embodiments, by analyzing the logical schema of the functions (e.g., input parameters and output parameters), similarity measurements may be computed for the two API functions. In some exemplary embodiments, similarly between API functions may indicate that they are connected to one another, a replacement of one another, or the like.

In some exemplary embodiments, the disclosed subject matter may validate that dataflow is in accordance with the expected logical schema. In some exemplary embodiments, in case dataflow diverts from expected logical schema, an alert may be issued or otherwise information may be logged. In some exemplary embodiments, diversion of the data from the logical data schema may not break a live dataflow, and the system may continue to operate. However, such a change may cause the system to fail be process data correctly and exhibit a bug. As an example, consider the schema change above, in which the string "XML" is first encountered. If the program expects to receive either "JSON" or "STRING", the program may simply compare the input parameter to "JSON" and assume that if it is not "JSON", it is "STRING" and be processed accordingly. Hence, when the data indicates "XML" the program continues to work but handles the input as a "STRING" instead of as an "XML".

In some exemplary embodiments, once a schema change in an API call is detected, the graph between API calls that represents any business process that uses the API that was changed may be tracked. In some exemplary embodiments, it may be checked whether the change is reflected in other APIs using the changed schema. For example: if an enumeration type is changed, other APIs that use the same enumeration may be checked as well, as they may have changed as well.

In some exemplary embodiments, backend invocations of API calls may not be visible to the frontend. The disclosed subject matter may utilize an additional agent executed at the backend for monitoring backend API calls. In some exemplary embodiments, information from the frontend may be augmented using information from the backend.

In some exemplary embodiments, the disclosed subject matter may be useful in supporting integration of applications in the user interface, such as embedded applications. For example, the disclosed subject matter may be utilized with respect to applications that are integrated via an iframe Hypertext Markup Language (HTML) element. In some exemplary embodiments, such integration may be implemented using the API of the embedded application. The disclosed subject matter may alert on changes if the schema of the returned value of the embedded application has changed. As an example, in some cases, a Google™ spreadsheet may be embedded within a project timeline in a knowledgebase application, such as Confluence™ or Zendesk™. As another example, a SalesForce™ widget may be embedded via its Software Development Kit (SDK) in a web-portal. In both examples, interaction with the embedded application may rely on their exposed APIs.

In some exemplary embodiments, the disclosed subject matter may be utilized for validating data privileges. In some cases, when the computerized system is developed, a control configuration may be omitted. The disclosed subject matter may be able to alert about unauthorized access so the developer who is responsible for the access controls for the API can tackle the issue. In some exemplary embodiments, the disclosed subject matter may implement a layer of validation for API change management that is privilege-aware, and ensures access permissions are respected.

As an example, in SalesForce™ a "Customer Rank" attribute of a success record may be retrieved from PowerBI™ in runtime. In a case an employee that does not have proper authorization to the PowerBI™ application is exposed to the success record, an alert may be issued. In some cases, the unauthorized data may be redacted by the client-side agent on the fly to prevent unauthorized access. It is noted that such functionality is enabled by the fact that the client-side agent is aware of the user-context One technical effect of the disclosed subject matter is utilizing client-side detection for API mapping. In some exemplary embodiments, by executing the client-side agent on the client-side, it can be ensured that all APIs that are in use throughout a user journey (e.g., a business process) are monitored. In some exemplary embodiments, by utilizing client-side analysis, it may be ensured that the system being analyzed is the "live" system, which is most up-to-date. Specifically, by analyzing the API calls, going out from the client device, the disclosed subject matter may be able to understand the latest footprint. In some exemplary embodiments, using client-side detection provides the ability to capture the most updated user experience that encapsulates all integrations, User Interface (UI) changes and business process changes.

In some exemplary embodiments, the disclosed subject matter may provide for dynamic and automated solution concerning changing, adding or removing APIs. Once a frontend changes and end-users use it, the client-side agent will detect it and commence its analysis.

Another technical effect of the disclosed subject matter may be the provisioning of real time alerts. In some exemplary embodiments, real time alerts may be useful in creating a short response cycle including testing locally before updating production environments to detect potential new bugs caused by a logical schema change.

In some exemplary embodiments, the logical schema change may not cause a runtime exception or other fatal bug that is easily discovered such as errors that are caused once the formally declared API prototype is violated. The disclosed subject matter enables the quick identification of cases where the logical schema has changed without violating the declared API prototype.

Yet another technical effect is the ability to perform the analysis without integration or update costs, and potentially without the involvement or assistance of the designer of the computerized system or developer of applications used in the application stack thereof. For example, a system that integrates a CRM application, BI tool, and e-mail marketing application, can be analyzed without the assistance of a developer of any such applications and without the assistance of the developer of the system itself. A user of the computerized system may operate a client-side agent on its device to analyze and identify API related issues. Such effect may be achieved as the disclosed subject matter does not rely on any backend analysis, and merely uses such analysis as an augmentation of the analysis performed at the frontend.

In some exemplary embodiments, the disclosed subject matter may be generic and operable on any system. The disclosed subject matter may not require prior configuration/definition, and it may operate on the client side and analyze all API traffic (e.g., incoming and outgoing APIs).

Yet another technical effect of the disclosed subject matter is enabling the analysis of the most up-to-date API interfaces, while being aware of user interaction with the frontend and the user context, including user credentials. The disclosed subject matter may enable the verification of user-level access permissions while using APIs of third-party applications, due to the monitoring being performed at the frontend, while the user is active.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1 showing an environment, in accordance with some exemplary embodiments of the disclosed subject matter.

Environment 100 may comprise a plurality of Client Devices 110. Client Devices 110 may be Personal Computers (PCs), tablets, smartphones, or the like. Client Devices 110 may be connected to a Computerized Network 105, such as a Wide Area Network (WAN), a Local Area Network (LAN), a wireless network, the Internet, an intranet, or the like.

In some exemplary embodiments, an Agent 115 may be running on a Client Device 110. In some exemplary embodiments, each Client Device 110 may execute a corresponding Agent 115. Additionally or alternatively, only a portion of Client Devices 110 may execute an Agent 115. Agent 115 may be a program product executable by a computer, such as, without limitations, a script, a software, a browser extension, a mobile application, a web application, a SDK, a Standard Widget Toolkit (SWT), a shared library, a Dynamic Link Library (DLL), a combination thereof, or the like.

Client Device 110 may be configured to execute an application or program having a GUI. The program may be, for example, a web page, a web application, a browser extension, a mobile application, desktop application, or the like. The program may display to an end-user one or more screens, constituting the GUI, which comprise GUI elements.

In some exemplary embodiments, Agent 115 may be configured to monitor API calls performed by the computerized system being operated. In some exemplary embodiments, Agent 115 may be operated solely when executing the frontend of the computerized system, such as being invoked by client-side code in web-pages of the web-based application, being invoked by code that is injected when visiting a specific Uniform Resource Location (URL), a domain, web-pages, or the like, such as by a browser extension, or the like. Additionally, or alternatively, Agent 115 may be provided with configurations identifying the frontend to be monitored, such as binary names, hash-based identifiers, or the like.

In some exemplary embodiments, Agent 115 may be separate from the frontend, developed in an independent manner and without access to development resources of the frontend or other parts of the computerized system. In some exemplary embodiments, Agent 115 may be operated without the consent or cooperation of the owner/developer of the computerized system or portions thereof. In some exemplary embodiments, the computerized system may be implemented using an application stack. The entity controlling Client Device 110 may have some control over or access to some of the applications in the application stack, and do not have any control or restricted access to other applications in the application stack. For example, the application stack may comprise proprietary third-party systems, e.g., Software as a Service (SaaS) vendors, such as SalesForce™, Zapier™, MailChimp™, Tableau™, Monday™, Slack™, or the like. The SaaS vendors may provide services via the form of a software that is utilized as part of the computerized system. Integration between different applications in the application stack may be based on API calls passing information therebetween or orchestrating the implementation of a functionality of a desired process or logic.

In some exemplary embodiments, Agent 115 may be a digital adoption platform agent implementing augmentation of client-side software and GUI, such as disclosed in U.S. Patent Application Publication US2014/0,298,162A1, entitled "CALLING SCRIPTS BASED TUTORIALS", published 20 Mar. 2018; U.S. Pat. No. 10,713,068, entitled "ACQUISITION PROCESS OF GUI ELEMENTS USING USER INPUT", published 14 Jul. 2020; U.S. Patent Application Publication US2020/0,348,951, entitled "GUI ELEMENT ACQUISITION USING A PLURALITY OF ALTERNATIVE REPRESENTATIONS OF THE GUI ELEMENT", published 5 Nov. 2020; U.S. patent application Ser. No. 17/170,121, entitled "AUTOMATED TESTING OF WALKTHROUGHS", filed 8 Feb. 2021, all of which are incorporated by reference in their entirety for all purposes without giving rise to disavowment. In some exemplary embodiments, Agent 115 may be configured to obtain usage information of the user with a frontend of the computerized system, to implement walkthroughs and other functionality augmentation of the computerized system, or the like. In some exemplary embodiments, in addition to such functionality, Agent 115 may be further configured to be utilized for API mapping, identification of logical function prototype violations, or the like. In such cases, the implementation of the disclosed subject matter may not require the installation or otherwise deployment of new agents, but simply the re-use of existing agents utilized for the digital adoption platform purposes.

Environment 100 may comprise a Server 120, which may be connected to Computerized Network 105. In some exemplary embodiments, Agent 115 may communicate information collected regarding API function invocations to Server 120.

In some exemplary embodiments, Server 120 may analyze collected data to create a mapping of API function utilization by the computerized system. The mapping may be represented by a graph comprising nodes and edges. In some exemplary embodiments, each node may represent an application having an invocable API or utilizing an API of other applications. Each edge may indicate invocation by a first application of a second application via an API function. In some exemplary embodiments, the edges may be directed indicating which application invoked which other application. In some exemplary embodiments, the edges may be annotated by the specific API function that was utilized.

In some exemplary embodiments, the graph may comprise nodes representing API calls and edges representing data transfer therebetween, indicating that a value received by an API call of a first API function is propagated, with or without additional processing, to a call to a second API function.

In some exemplary embodiments, Server 120 may determine, based on collected data from Agent(s) 115 a logical schema of each API function in the mapping. The logical schema may define a logical function prototype comprising one or more input parameters and one or more output parameters. The type of the parameter, as declared in the (actual, declared, technical and non-logical) function prototype, may be modified. Specifically, the function prototype may define a domain of potential values for a parameter, and the logical function prototype may define a sub-domain of the domain, excluding at least one value thereof. The logical schema may be determined based on the usage of the values of the parameter in the frontend (e.g., in case of output parameters), based on the source of the values of the parameter in the frontend (e.g., in case of input parameters), based on values observed to such parameters by Agent(s) 115, or the like.

Figure 2:
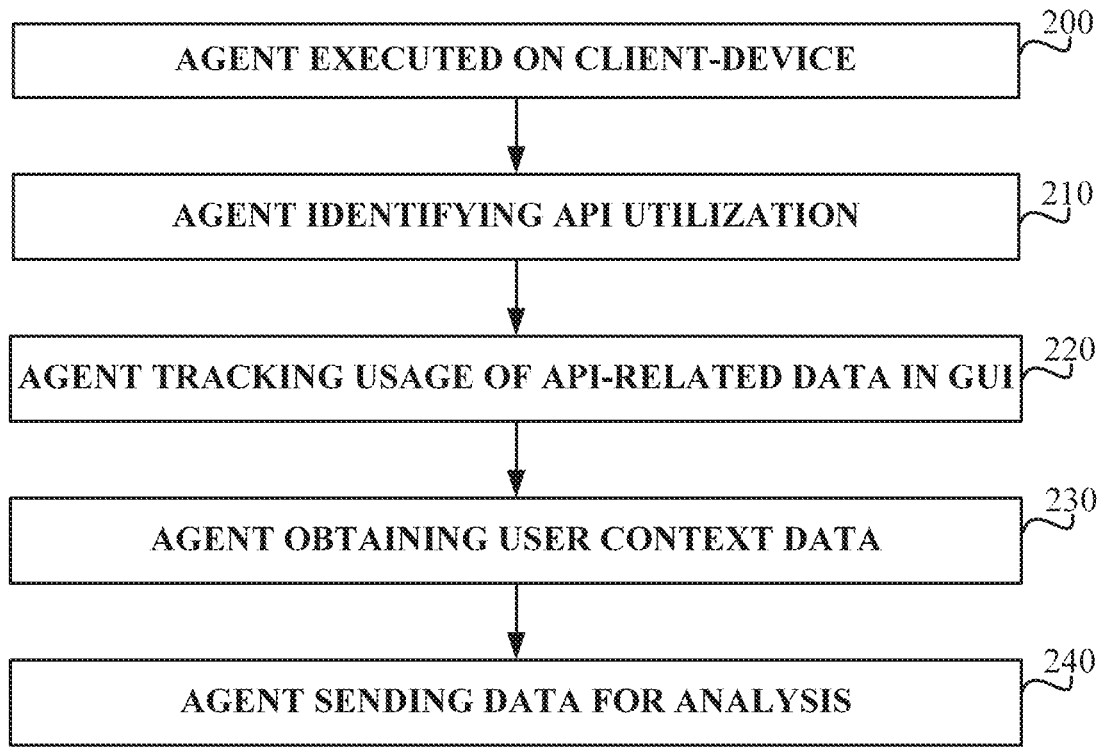
FIG. 2 shows a flowchart diagram of a method, in accordance with some exemplary embodiments of the disclosed subject matter.

Referring now to FIG. 2 showing a flowchart diagram of a method, in accordance with some exemplary embodiments of the disclosed subject matter.

On Step 200, an agent is executed on a client device. The agent, such as 115 of FIG. 1, may be executed as an independent process having permissions sufficient to observe operation of processes associated with the frontend of the computerized system. Additionally, or alternatively, the agent may be executed in tandem with the frontend. As an example, the agent may be implemented in client-side JavaScript code that is injected to a web-based application document by a browser extension. Additionally, or alternatively, the client-side JavaScript code may be introduced to the source code of the web-based application document by the developer of the web-based application (e.g., in case the developer is collaborating with the API mapping activity). Additionally, or alternatively, the agent may be implemented as a script, a software, a browser extension, a mobile application, a web application, a Software Development Kit (SDK), a Standard Widget Toolkit (SWT), a shared library, a Dynamic Link Library (DLL), a combination thereof, or the like. For the clarity of the disclosure, the disclosed subject matter may be explained in detail while referring to web-based systems. However, the disclosed subject matter is not limited to such embodiment.

On Step 210, the agent may identify API utilization by the frontend. In some exemplary embodiments, the agent may monitor for API invocations. For example, the agent may listen on events that are triggered by the browser, such as accessing web services via Hypertext Transfer Protocol (HTTP). In some exemplary embodiments, the agent may monitor values of input parameters provided to the API functions that are being invoked, values of output parameters returned by the API functions, or the like.

On Step 220, the agent may track utilization of API-related data in the GUI of the frontend. In some exemplary embodiments, the agent may track the values, their source of origin, their target destination, or the like.

In some exemplary embodiments, the agent may track the origin of the value in the frontend and utilize information regarding the origin to define the logical function prototype. For example, the value may be set by the user, using a GUI element. In such cases, the properties of the GUI element may be considered as applicable to the values of the relevant parameter. Consider that the value of a String input parameter is set using a GUI selector, which enables the user to select in the GUI from a predetermined set of values. In such a case, the input value may be an enumeration type, which is defined by the set of potential values defined by the GUI selector. Consider a different example, in which the GUI element is a free-text field upon which value, a client-side validation method is implemented to ensure that the value is in line with a predefined regular expression. In such a case, the input parameter may be determined to include only the sub-domain of the general string domain that matches the predefined regular expression defined by the input-data validator. As another example, the value may be passed to the input parameter based on a value received as an output parameter of another API function. Hence, the input parameter of the API function and the output parameter of the other API function may be determined to be of a same logical type, having the same sub-domain. Hence, any information that can be determined about one of these parameters can be deduced to be applicable to the other one as well. In some cases, in such a scenario, the input parameter may be determined of a logical type that is inclusive of the logical type of the output parameter. For example, consider the output parameter being an enumeration having two values ("YES", "NO"). If the value of the input parameter is, in some cases, fed based on another element, such as GUI selector having the values "YES", "MAYBE", then the logical type of the input parameter may be an enumeration that is inclusive of all potential values: "YES", "NO" and "MAYBE". In such a case, the values of the sub-domain of the output parameter are included in the sub-domain of the corresponding input parameter, which may include additional values as well.

On Step 230, the agent may obtain user-context data. Because the agent is operative in the frontend, while the user is active, the agent is privy to all information that is accessible to the user. The user-context information may be useful for analyzing API utilizations in different contexts, under different user privileges, or the like. In some cases, the user profile in the computerized system may be identified. Additionally or alternatively, the permission levels and privileges of the user with respect to each application of the application stack may be retrieved and monitored. It is noted that throughout the user journey during the business process, the frontend may activate different applications in which the user may have different privileges. In case the system utilizes API keys, API credentials, or the like, such information may also be monitored and tracked for analysis purposes.

On Step 240, the agent may transmit the collected data to be analyzed. It is noted that in some embodiments, the agent may perform the analysis, and in such cases, the collected data may not need to be transmitted. Additionally or alternatively, one agent may be a centralized agent performing analysis based on the information it gathered as well as obtained by other agents. In some exemplary embodiments, the data may be transmitted immediately upon being obtained, periodically in a batch transmission, combination thereof, or the like.

Figure 3:
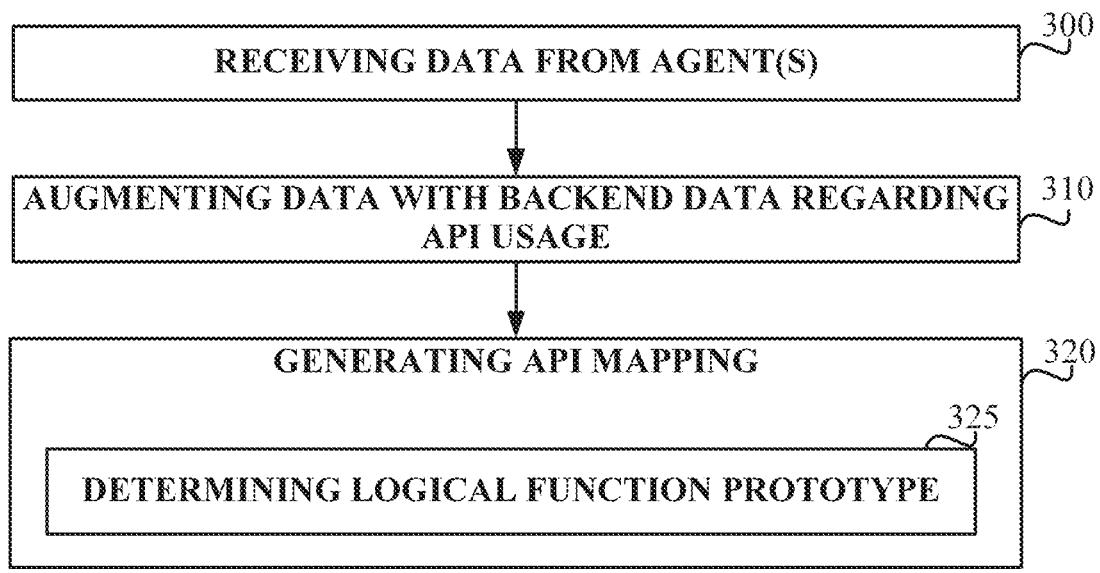
FIG. 3 shows a flowchart diagram of a method, in accordance with some exemplary embodiments of the disclosed subject matter.

Referring now to FIG. 3 showing a flowchart diagram of a method, in accordance with some exemplary embodiments of the disclosed subject matter. FIG. 3 illustrates the method of creating the API mapping based on data collected by an agent or a plurality of agents.

On Step 300, the data transmitted by agent(s), e.g., on Step 240 of FIG. 2, may be received or otherwise obtained by a server or other device performing the analysis.

On Step 310, the data may be augmented by backend data. In some exemplary embodiments, some API invocations may occur in the backend, and may not be monitored by the agents operating at the frontend. In some exemplary embodiments, the backend may be executed remotely to the frontend and without user-visible interface. Such data may be tracked independently, such as by a server-side agent. It is noted that the server-side agent may be operated in a stateless environment, may be unaware of user-credentials and GUI utilization by the user who triggered, indirectly, the API invocation. For example, consider an API call for deleting a record in SalesForce™ that is invoked at the backend, in response to a user query. Such activity may not be visible to the server-side agent, who may not receive any information regarding the user who activated the user query. This is in contrast to the client-side agent that identifies the activation of the user query (e.g., using an API function of the server), which may aware of the user privileges and the user's usage of the GUI.

On Step 320, an API mapping may be created. The API mapping may comprise nodes and edges, where nodes represent an application of the application stack, and edges represent activation of APIs between applications of the application stack. In some exemplary embodiments, the edges may be annotated with logical prototype of the activated API function.

On Step 325, a logical function prototype of API function may be determined. In some exemplary embodiments, the logical function prototype of the API function may differ from the declared, formal and technical, function prototype, as it may relate to the logical schema of the API function. In some cases, the logical function prototype may exclude at least some values that are allowed by the technical function prototype, e.g., a sub-domain of the parameter, which is a strict subset of domain defined by the function prototype for the parameter. Determining the sub-domain may be based on correlation between the parameter and other parameters. For example, the correlation may be based on their respective potential values, either logically (e.g., a String type that logically only receives a limited number of enumerated string values) or technically (e.g., an integer value of 8 bits receiving value defined technically as 4 bit integer). As another example, the correlation may be a correlation between the parameter and a GUI element, such as a GUI selector element defining an enumerated value, an element having a data validator defining valid and invalid values, or the like.

Figure 4:
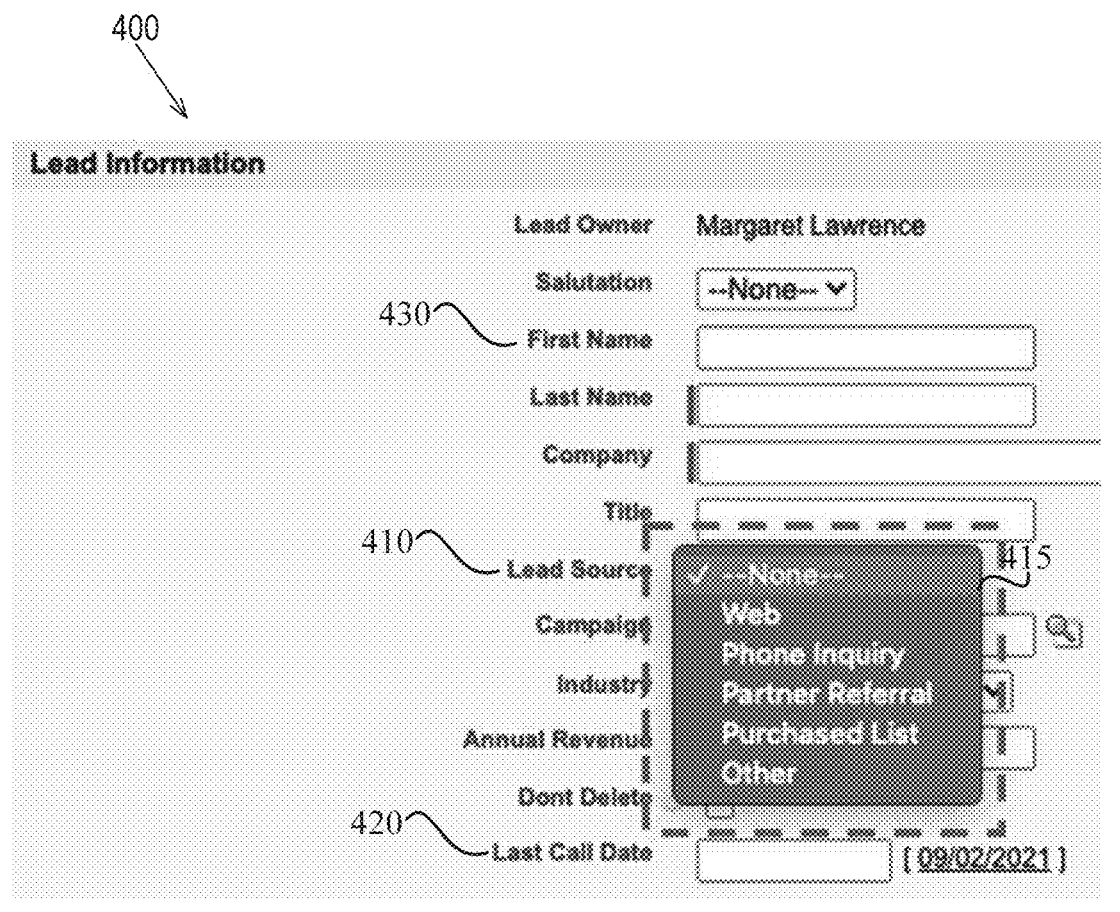

Reference is now made to FIG. 4, which shows an illustration of an exemplary Graphical User Interface (GUI). GUI 400 includes a Lead Source 410 GUI element. The user may select a value for Lead Source 410 using a Selector Element 415. In the present illustration, Selector Element 415 is a dropdown list widget. However, the selector is not limited to such embodiment and it may be implemented using other widgets such as a radio button, multiple choice select-box widget, or the like. The potential values of Lead Source 410 are determined to be limited to the options of Selector Element 415. Hence, if the value of Lead Source 410 is fed into an input parameter of an API function, such input parameter may be determined to having a logical function prototype that defines the set of values based on the options of Selector Element 415. Such analysis may be enabled due to the client-side agent monitoring the frontend and identifying correlations between GUI elements and API parameters.

As another example, the correlation between Last Call Date 420 and an output parameter of an API function of type String may be used to determine that the logical function prototype of the API function is in fact of a date format (e.g., "dd/mm/yyyy", "mm.dd.yyyy", or the like). In such an embodiment, the usage of the output parameter to set a value in a Document Object Model (DOM) that has an automatically identifiable semantic meaning may be used to determine the logical schema of the API function.

As yet another example, First Name 430 element may be associated with a data validator. For example, the data validator may exclude names of less than three characters; exclude names of more than 20 characters; restrict the name to include only Latin characters; restrict only the first character to be uppercase; or the like. Based on the configuration of the data validator, the logical schema of API functions that receive the value set in First Name 430 (e.g., "x.com/save") or set the value into First Name 430 (e.g., "x.com/load") may be determined.

Figure 5A:
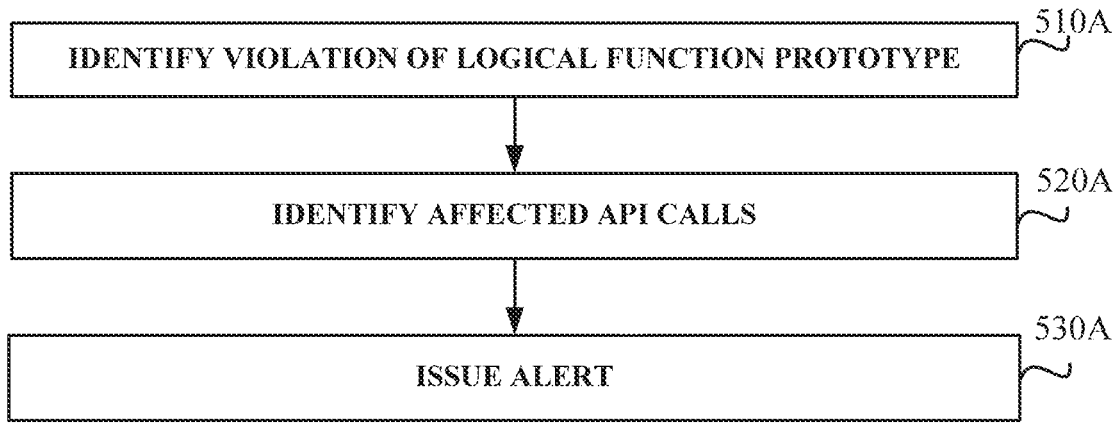
FIGS. 5A-5E show flowchart diagrams of methods, in accordance with some exemplary embodiments of the disclosed subject matter.

Referring now to FIG. 5A showing a flowchart diagram of a method, in accordance with some exemplary embodiments of the disclosed subject matter.

On Step 510A, a violation of a logical function prototype is identified. In some exemplary embodiments, the identification is performed in real-time, such as by a client-side agent, in retrospect, such as by a server receiving information regarding API usage or monitoring such usage, or the like.

In some exemplary embodiments, the violation may be identified based on a value excluded from a respective sub-domain of a parameter being utilized. In some cases, as the excluded value is within the domain, a runtime error or exception may not be caused, and the API function may be executed. In some exemplary embodiments, the signature of the API function may remain unchanged, and the API may be robust and would not "break". No compilation or runtime errors may be creates as the API function is being used in a manner that is technically correct. However, semantically, the manner in which the API should be used may have changed. In some exemplary embodiments, such a change may cause a logical bug and the intended functionality of the API function or the computerized system may not be performed.

As an example, in case of a declared type of String, which is determined to be a logical enumeration type, a string value that is not among the enumerated values may be technically legal, may not cause a runtime error to occur. However, as the value is not one of the values that the system is configured to receive and handle, the outcome of processing such value may be unexpected or otherwise differ from the expected functionality of the computerized system. In some exemplary embodiments, an enumeration may include a group of closed inputs {"Male", "Female"}, and a change in the enumeration could be adding the input "Gender-Neutral" to the group. Another change could be a different grouping (e.g., {(0-21), (21-infinity)} could be changed into {(0-18), (18-21), (21-60), (60-infinity)}.

In some exemplary embodiments, when using an API to integrate data from third party applications, the disclosed subject matter can automatically detect schema changes based on detected violations of violation of logical function prototype.

On Step 520A, affected API calls may be identified based on the API mapping. In some exemplary embodiments, a value that violates a logical function prototype may be propagated to other API functions in additional API invocations, of the same application in the application stack or of different applications. For example, a value received from the CRM application via its API may be propagated into the email marketing application via its API and may be provided also to a BI application via its designated API. Hence, such value that violates the logical function prototype of the API function may also violate other, affected, API functions. In some exemplary embodiments, the API mapping may be traversed using edges that use the same logical function prototype, or that are determined to be connected to identify affected or potentially affected API calls.

On Step 530A, an alert may be issued. The alert may be issued to the user, to a developer of the computerized system, to an administrator of the computerized system, or the like. In some exemplary embodiments, the alert may indicate the violation, such as by indicating the API function, the value, and the like. In some exemplary embodiments, privacy-preserving techniques may be employed to prevent sensitive data from being presented to unauthorized users, such as using hashing, data anonymization, or the like.

In some exemplary embodiments, the alert may be immediate. Additionally or alternatively, the alert may be presented in a periodic report.

Figure 5B:
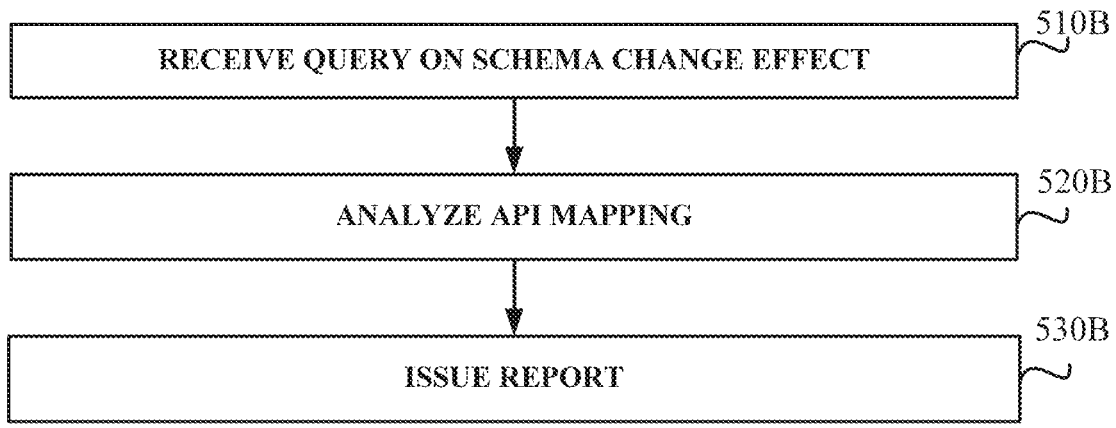

Referring now to FIG. 5B showing a flowchart diagram of a method, in accordance with some exemplary embodiments of the disclosed subject matter.

On Step M0B, a query on an effect of a schema change may be received. In some exemplary embodiments, before applying a change, the business owner, developer of the computerized system, or the like, may provide a query to perform risk assessment of potential effects of a change. In some cases, a user may define a query indicating a potential schema change, such as modifying a logical function prototype of one or more API functions.

On Step 520B, the API mapping may be analyzed to identify potential effects of such a schema change. In some exemplary embodiments, the schema change may be simulated in the API mapping to determine potential impact of the schema change on the computerized system. In some exemplary embodiments, the graph of connected API calls may be traversed, starting from the node representing the modified API function. In some exemplary embodiments, the traversal may be performed in Breadth-First Order (BFS), Deep-First Order (DFS), or the like. Any potentially affected API function may be identified and noted. In some exemplary embodiments, the data flow of values from parameters of one API function to another may be tracked using the API mapping, and such traversal may be utilized to automatically identify potentially affected API functions.

On Step 530B, a report indicating potentially affected API functions may be provided to the user. The report may be provided in response to the query of Step M0B. In some exemplary embodiments, the user may review the report, investigate potential effects of the schema change, and attempt to reduce the risk of implementing such a change in the production environment. In some cases, the user may decide to implement additional schema changes in other functions as well and a new query, representing changes in multiple functions, may be defined and provided in Step 510B.

Figure 5C:
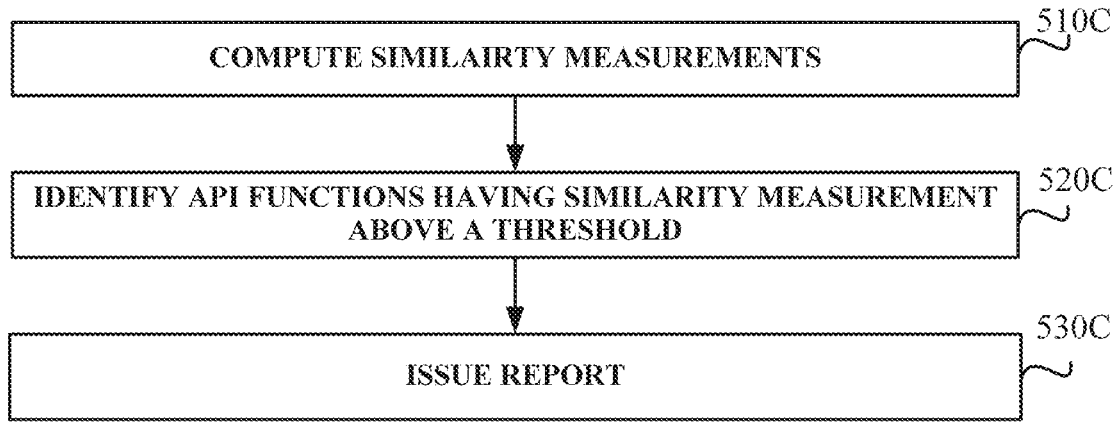

Referring now to FIG. 5C showing a flowchart diagram of a method, in accordance with some exemplary embodiments of the disclosed subject matter.

On Step 510C, similarity measurements between API functions may be computed. In some exemplary embodiments, pairs of API functions in the API mapping may be analyzed and for each such pair a similarity measurement may be computed. The similarity measurement may be based on the input and output parameters of each API function of the pair, and their respective logical function prototypes.

For example, consider two API functions of two different and independent applications in the application stack: app1.com/func1(inPara1<String>, inPara2<Integer>)→outPara <Object>, and app2.com/func2(inPara1<String>, inPara2<Integer>)→outPara <Object>. Although there are two separate API functions, if the logical function prototype of the functions is similar or identical, it may be indicative of similarity in their functionality. For example, if the logical function prototypes for both functions is (inPara1<Enum{Male, Female}>, inPara2<{0 . . . 10}>) →outPara <Object-User>, the similarity measurement may be determined to be relatively high. In this example, both functions have two input parameters and one output parameter. The input parameters include an enumeration having two identical values ("Male" and "Female") as well as an integer in the range of 0-10. The output parameter is an object of a same type. The similarity metric may or may not depend on an order of the parameters (e.g., metric(inPara1, inPara2)=metric (inPara2, inPara1)). Additionally or alternatively, the similarity metric may be configured to provide higher similarity values when comparing less common, rarer logical types. For example, the logical type of general string is more common than the logical type of {"Male", "Female"} string enumeration, which is in itself more common than a string enumeration of {"David Bowie", "John Lenon"}.

In some exemplary embodiments, the similarity metric may be based on a distance metric indicating a distance, e.g., dissimilarity, between the two prototypes. In some exemplary embodiments, the similarity metric may disregard the naming of the API functions. Additionally or alternatively, the semantic meaning of the names may be extracted, such as using topic summarization techniques or other Natural Language Processing (NLP) methods, and utilized for similarity measurement computation.

In some exemplary embodiments, the computerized system may invoke multiple APIs, it might be that the system has incorporated multiple versions of the same API. This can lead to a void call or invocation of deprecated API versions over time, which eventually will not return content for the invoked system. Moreover, it increases application network calls and impact performance. The disclosed subject matter may be utilized to detect duplicate calls. In some exemplary embodiments, each invocation of an API function may be monitored and mapped. All hosts, paths and schemas may be identified. Invocations of different API calls may be correlated based on the input parameters, the output parameters, the path of the API function, the name of the API function, or the like, to identify similarities in different APIs. In some cases, such analysis may be useful in identifying utilization of two versions of the same application.

On Step 520C, different API functions that are considered similar may be identified based on their similarity measurement being above a threshold. Additionally or alternatively, an equivalent manner of identifying similar API functions may be based on finding API functions with dissimilarity measurement below a threshold (e.g., between zero, representing identical prototypes, and a predetermined threshold value).

In some exemplary embodiments, instead of or in addition to analyzing pairs of API functions, pairs of APIs may be analyzed. Each API may be of a different application in the application stack and the set of utilized API functions of each API may be examined and used to compute the similarity between the two APIs.

On Step 530C, a report based on the similar API functions that were identified may be issued.

Figure 5D:
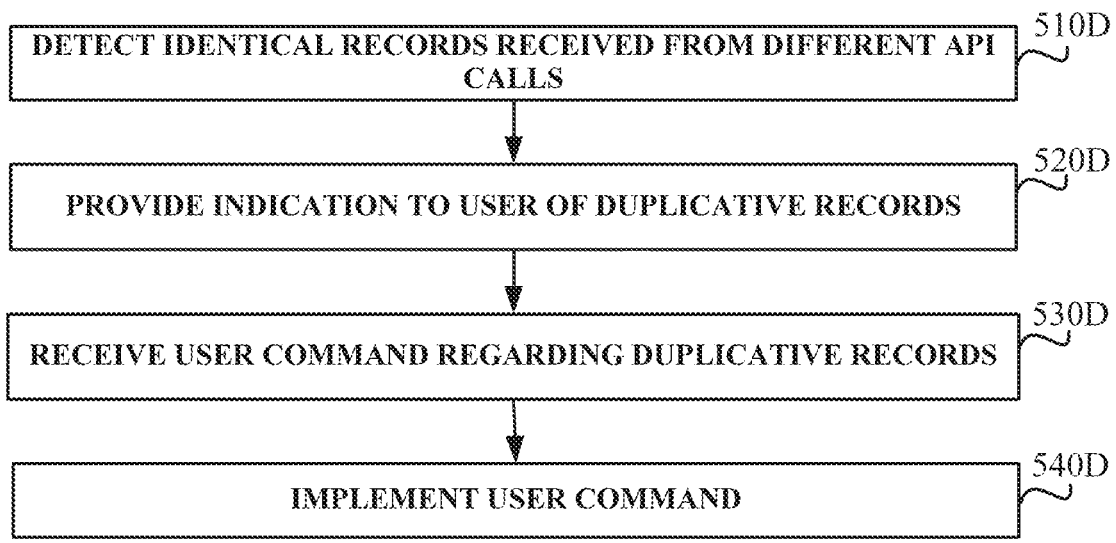

Referring now to FIG. 5D showing a flowchart diagram of a method, in accordance with some exemplary embodiments of the disclosed subject matter. FIG. 5D illustrates a method in which the frontend may be tracked to identify duplicate records. Accordingly, a single source of truth for the computerized system may be determined and API replacements may be suggested. Based on the logical schema determination, identical or similar records may be identified (Step 510D). Such records may be detected based on their logical schemas of their attributes and the values of such attributes are identical. Such records that hold the same logical schema and have the same values may be received from different source, such as different API functions, different APIs, different applications, or the like. In some cases, receiving duplicative records from different source may cause ambiguity when reading the data. For example, a similar lead object integrated to a CRM application can be returned from a marketing automation platform and from a sales platform.

On Step 520D, indications may be provided to the user regarding the duplicative records. In some exemplary embodiments, the indications may be provided via the frontend of the computerized system, such as by augmenting the GUI of the frontend to mark the duplicative records. In some exemplary embodiments, the client-side agent may manipulate the frontend to implement such visual marking without the assistance of the computerized system. As an example, consider a web-based application, the client-side agent may manipulate the DOM of the presented page to implement such marking of the duplicative record. In some cases, the DOM may be manipulated to introduce a GUI widget enabling the user to provide a command regarding the duplicative record.

On Step 530D, a user command regarding the duplicative records may be received. The command may be a selection of the most relevant record to be preserved, a selection of the source of truth to reduce future ambiguity and increase data quality, or the like. In some exemplary embodiments, the user command may be provided via a widget introduced by the disclosed subject matter on Step 520D. Additionally or alternatively, the command may be provided through any other means, such as command line instruction, administration interface, or the like.

On Step 540D, the user command may be implemented. In some cases, duplicative records may be deleted. Additionally or alternatively, the computerized system may be modified, automatically, to use a different API function instead of the API function that returned a duplicative record, so as to ensure receiving the data from the single source of truth and avoid potential ambiguity, or the like.

Figure 5E:
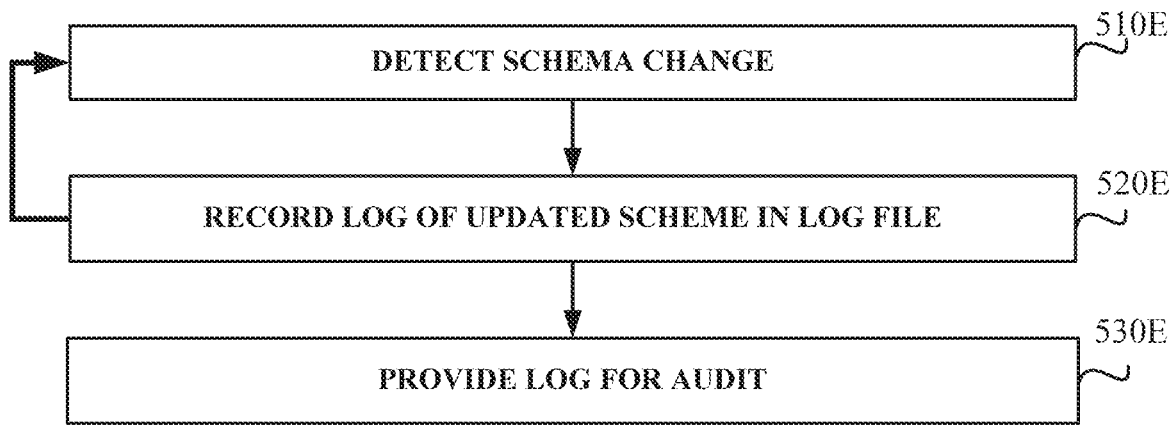

Referring now to FIG. 5E showing a flowchart diagram of a method, in accordance with some exemplary embodiments of the disclosed subject matter. FIG. 5E exemplifies the implementation of a schema log of the computerized system. Once a schema change is detected (510E), the updated logical schema is recorded in a log file (520E). This may be performed repeatedly over time. Once an audit, automated or manual, is desired, the log may be provisioned (530E), indicating each state of the logical schemas of the different applications in the application stack. In some exemplary embodiments, the log may include each revision of the logical function prototype of each API function, with the date and time of the change, or the like.

Figure 6:
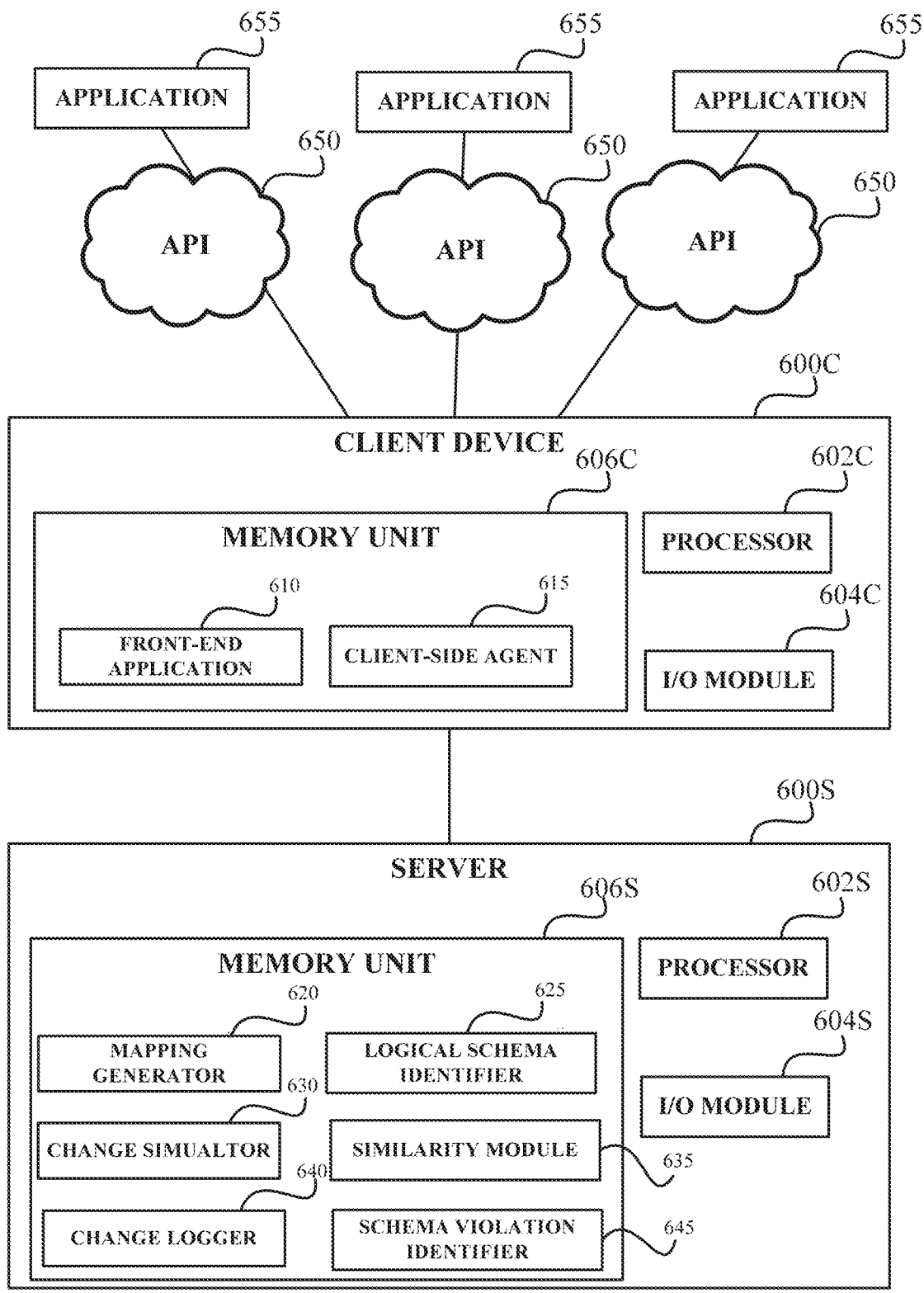
FIG. 6 shows a block diagram of a system, in accordance with some exemplary embodiments of the disclosed subject matter.

Referring now to FIG. 6, showing a block diagram of a system, in accordance with some exemplary embodiments of the disclosed subject matter.

Server 600S, such as Server 120 of FIG. 1 may comprise Processor 602S, I/O Module 604S, and Memory Unit 606S. Similarly, Client Device 600C, such as 110 of FIG. 1, may comprise Processor 602C, I/O Module 604C, and Memory Unit 606C.

In some exemplary embodiments, Processor 602C, 602S may be a Central Processing Unit (CPU), a Graphical Processing Unit (GPU), a microprocessor, an electronic circuit, an Integrated Circuit (IC) or the like. Processor 602C, 602S may be utilized to perform computations required by Client Device 600C and Server 600S, respectively.

In some exemplary embodiments, Input/Output (I/O) Module 604C, 604S may be utilized to communicate with other computerized devices, such as over a network (e.g., 105 of FIG. 1). In some exemplary embodiments, I/O Modules 604C, 604S may enable communication between Client Device 600C and Server 600S, and the invocation of API functions of third-party applications, such as Applications 655, by Client Device 600C or by Server 600S.

In some exemplary embodiments, Memory Unit 606C, 606S may be a hard disk drive, a Flash disk, a Random Access Memory (RAM), a memory chip, or the like. In some exemplary embodiments, Memory Unit 606C, 606S may retain program code operative to cause Processor 602C, 602S to perform acts in accordance with various methods in accordance with the disclosed subject matter, including methods depicted in FIGS. 2-4, and 5A-5E.

In some exemplary embodiments, Front-End Application 610 may be retained on Memory Unit 606C. Front-End Application 610 may implement the front end of the computerized system that is utilized by the user, which may be based on an application stack, including Application(s) 655. In some exemplary embodiments, each application may expose a respective API 650 enabling other programs, including Front-End Application 610 to invoke functionality of the respective Application 655. In some exemplary embodiments, Front-End Application 610 may be indifferent to modification of Application 655, as long as the exposed API 650 remains unchanged. However, such changes may induce a logical change that may require attention of the developers of the computerized system.

In some exemplary embodiments, Front-End Application 610 may be a native mobile app that is installed on Client Device 600C. Additionally or alternatively, Front-End Application 610 may be a desktop application installed on the Client Device 600C. Additionally or alternatively, Front-End Application 610 may be a web-based application retrieved from a remote server, such as a web-server, and executed on Client Device 600C without retaining such application over time. Front-End Application 610 may implement a GUI used by a user (not shown) who may utilize input devices, such as a keyboard, a pointing device, a touch screen, a microphone, or the like, to interact with the computerized system.

In some exemplary embodiments, Client-Side Agent 615, such as 115 of FIG. 1, may be configured to operate on Client Device 600C, to monitor and collect information regarding invocations of API functions via APIs 650, data flow between different API calls, between API calls and GUI elements, or the like.

In some exemplary embodiments, Mapping Generator 620 may be configured to create an API mapping based on data collected by Client-Side Agent(s) 615. In some exemplary embodiments, the mapping may indicate data flow between APIs, API functions, or the like. Additionally or alternatively, the mapping may indicate the logical function prototype of API functions, which may be determined by Logical Schema Identifier 625. In some exemplary embodiments, Logical Schema Identifier 625 may be configured to track values of parameters to determine the logical type of the parameters. For example, logical enumeration type may be identified based on identifying a relatively small number of identical values that are repeatedly used. As another example, specific values used may be identified to automatically determine a format that the value of the parameter must hold.

In some exemplary embodiments, Change Simulator 630 may be configured to simulate a change in a logical schema of an API function, to identify potential impact of such change. In some exemplary embodiments, Change Simulator 630 may be utilized in performing the steps of FIG. 5B.

In some exemplary embodiments, Similarity Module 635 may be configured to compute similarity measurement between APIs 650, between API functions, or the like. In some exemplary embodiments, Similarity Module 635 may be utilized in performing the steps of FIG. 5C.

In some exemplary embodiments, Change Logger 640 may be configured to identify schema changes and log such changes in a log. Change Logger 640 may be utilized in performing the steps of FIG. 5E.

In some exemplary embodiments, Schema Violation Identifier 645 may be configured to identify schema violations. In some exemplary embodiments, Schema Violation Identifier 645 may be utilized in performing the steps of FIG. 5A. In some exemplary embodiments, in response to a violation identified by Schema Violation Identifier 645, Logical Schema Identifier 625 may determine a new schema and Change Logger 640 may log a new schema change in the schema change log.

In some exemplary embodiments, Schema Violation Identifier 645 may identify that a value of a parameter violates a pre-identified logical scheme of the parameter. It is noted that the violation of a logical schema may be identified with respect to each parameter individually. For example, if other values of the other parameters in the same API function are identical, such information does not affect whether or not the logical schema of the parameter being examined was violated. Put differently, the disclosed subject matter is not intended to perform anomaly detection of valuations of parameters, but is configured to identify values of a specific parameter violating its respective logical type, thereby infringing upon the logical function prototype.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    creating a mapping of Application Programming Interface (API) functions utilization by a computerized system, wherein the computerized system comprises a plurality of applications that are configured to interact with one another using APIs, wherein said creating comprises:
        detecting, by a client-side agent that is operated on a client device executing a frontend of the computerized system, an invocation by a first application of an API function of a second application, wherein the API function is defined by a function prototype comprising a domain of potential values for an input or output parameter of the API function; and
        based on information gathered by the client-side agent, automatically determining a logical schema of the API function, wherein the logical schema defines a logical function prototype, the logical function prototype comprising a sub-domain of the domain of potential values, the sub-domain restricting at least one value of the domain; and
    performing an action using the mapping.

2. The method of claim 1, wherein the domain is a string domain, wherein the sub-domain represents an enumeration of a set of predetermined strings.

3. The method of claim 1, wherein said automatically determining the logical schema comprises: identifying, at the frontend, a correlation between the input or output parameter of the API function and between a Graphical User Interface (GUI) selector element, wherein the GUI selector element defines the sub-domain.

4. The method of claim 1, wherein said automatically determining the logical schema comprises: identifying, at the frontend, a correlation between the input or output parameter of the API function and a Graphical User Interface (GUI) element having a data validation method configured to validate that data at the GUI element is in line with a validation rule, wherein the validation rule defines the sub-domain.

5. The method of claim 1, wherein said automatically determining the logical schema comprises:
    obtaining values of the input or output parameter across multiple executions of the computerized system; and
    determining the sub-domain based on an aggregation of the obtained values.

6. The method of claim 1, wherein said performing an action comprises:
    detecting a schema change, wherein the schema change is detected based on an identification of a value that is in line with the domain defined by the function prototype and is restricted by the sub-domain defined by the logical function prototype, the value is provisioned as an input parameter to the API function or is received as an output parameter of the API function; and
    reporting the schema change to a user.

7. The method of claim 6, wherein said reporting comprises reporting the schema change of an affected API function, wherein the affected API function is identified based on the mapping.

8. The method of claim 1, wherein said performing the action comprises:
    identifying, in the mapping, two similar API functions, wherein said identifying the two similar API functions comprises:
    computing a similarity measurement for each pair of API functions in the mapping, wherein the similarity measurement is based on a similarity of input and output parameters in a respective logical function prototype of each API function; and
    identifying a pair of API functions having a computed similarity measurement that is greater than a threshold.

9. The method of claim 1, wherein said performing the action comprises identifying duplicate records obtained from two different API functions, wherein said identifying the duplicate records comprises:
    identifying a first record received from the API function having the logical function prototype;
    identifying a second record received from a second API function having the logical function prototype;
    detecting that the first record and the second record are identical; and
    presenting in a Graphical User Interface (GUI) the first record and the second record as duplicate records.

10. The method of claim 1, wherein said performing the action comprises: simulating a schema change in the mapping to determine a potential impact of the schema change on the computerized system; and outputting a report regarding the potential impact.

11. The method of claim 1, wherein said creating the mapping is further based on a backend analysis of invocations of the API functions at a backend of the computerized system, wherein the backend is executed remotely to the frontend and without a user-visible interface.

12. The method of claim 1, wherein the client-side agent is at least one of:
a standalone, client-side, program;
a client-side code defined by the computerized system to be executed on the client device;
a browser that is executed on the client device and utilized for operating the frontend of the computerized system; and
a browser extension augmenting functionality of the browser.

13. The method of claim 1, wherein the computerized system comprises at least one of:
a web application;
a mobile application; and
a desktop application.

14. A system comprising:
a processor; a memory coupled to the processor; and one or more client-side agents configured to be executed by respective client devices;
wherein each client-side agent of said one or more client-side agents is configured be operated on a respective client device executing a frontend of a computerized system, wherein said each client-side agent is configured to detect an invocation, by a first application, of an Application Programming Interface (API) function of a second application, wherein the API function is defined by a function prototype comprising a domain of potential values for an input or output parameter of the API function;
wherein said processor is configured to create a mapping of API functions utilization by the computerized system, wherein the computerized system comprises a plurality of applications that are configured to interact with one another using APIs, wherein the mapping is determined based on information gathered by said one or more client-side agents, wherein said processor is configured to automatically determine a logical schema of the API function, wherein the logical schema defines a logical function prototype, the logical function prototype comprising a sub-domain of the domain of potential values, the sub-domain restricting at least one value of the domain.

15. The system of claim 14, wherein the domain is a string domain, wherein the sub-domain represents an enumeration of a set of predetermined strings.

16. The system of claim 14, wherein said the logical schema is determined by identifying, at the frontend, a correlation between the input or output parameter of the API function and between a Graphical User Interface (GUI) selector element, wherein the GUI selector element defines the sub-domain.

17. The system of claim 14, wherein the logical schema is determined by identifying, at the frontend, a correlation between the input or output parameter of the API function and a Graphical User Interface (GUI) element having a data validation method configured to validate that data at the GUI element is in line with a validation rule, wherein the validation rule defines the sub-domain.

18. The system of claim 14, wherein the sub-domain is determined based on an aggregation of obtained values of the input or output parameter across multiple executions of the computerized system.

19. The system of claim 14, wherein said system is configured to:
detect a schema change, wherein the schema change is detected based on an identification of a value that is in line with the domain defined by the function prototype and is restricted by the sub-domain defined by the logical function prototype, the value is provisioned as an input parameter to the API function or is received as an output parameter of the API function; and
report the schema change to a user.

20. The system of claim 14, wherein said system is configured to identify two similar API functions in the mapping, wherein identification of the two similar API functions is based on a computation of a similarity measurement for each pair of API functions in the mapping, wherein the similarity measurement is based on a similarity of input and output parameters in a respective logical function prototype of each API function.

21. The system of claim 14 further configured to identify duplicate records obtained from two different API functions, wherein identification of the duplicate records comprises:
identifying a first record received from the API function having the logical function prototype;
identifying a second record received from a second API function having the logical function prototype;
detecting that the first record and the second record are identical; and
presenting in a Graphical User Interface (GUI) the first record and the second record as duplicate records.

22. The system of claim 14, wherein said processor is configured to simulate a schema change in the mapping to determine a potential impact of the schema change on the computerized system, wherein said system is configured to output a report regarding the potential impact.

23. The system of claim 14 further comprises a backend analysis module configured to analyze invocations of the API functions at a backend of the computerized system, wherein the backend is executed remotely to the frontend and without a user-visible interface, wherein the mapping is determined based on an analysis by said backend analysis module.

24. A non-transitory computer readable medium retaining program instructions, which program instructions when read by a processor, cause the processor to create a mapping of Application Programming Interface (API) functions utilization by a computerized system, wherein the computerized system comprises a plurality of applications that are configured to interact with one another using APIs, wherein said the mapping of API functions utilization is created by:
detecting, by a client-side agent that is operated on a client device executing a frontend of the computerized system, an invocation, by a first application, of an API function of a second application, wherein the API function is defined by a function prototype comprising a domain of potential values for an input or output parameter of the API function; and
based on information gathered by the client-side agent, automatically determining a logical schema of the API function, wherein the logical schema defines a logical function prototype, the logical function prototype comprising a sub-domain of the domain of potential values, the sub-domain restricting at least one value of the domain; and wherein said program instructions when read by the processor, cause the processor to perform an action using the mapping.

25. The non-transitory computer readable medium of claim 24, wherein the domain is a string domain, wherein the sub-domain represents an enumeration of a set of predetermined strings.

26. The non-transitory computer readable medium of claim 24, wherein said automatically determining the logical schema comprises: identifying, at the frontend, a correlation between the input or output parameter of the API function and between a Graphical User Interface (GUI) selector element, wherein the GUI selector element defines the sub-domain.

27. The non-transitory computer readable medium of claim 24, wherein said automatically determining the logical schema comprises: identifying, at the frontend, a correlation between the input or output parameter of the API function and a Graphical User Interface (GUI) GUI-element having a data validation method configured to validate that data at the GUI element is in line with a validation rule, wherein the validation rule defines the sub-domain.

* * * * *